(12) United States Patent
Poole

(10) Patent No.: US 9,113,093 B1
(45) Date of Patent: Aug. 18, 2015

(54) METHOD AND SYSTEM FOR CONFIGURING A PRINTER USING PAPER-BASED DIALOG BOXES

(71) Applicant: Marvell International Ltd., Hamilton (BM)

(72) Inventor: David K. Poole, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/148,398

(22) Filed: Jan. 6, 2014

Related U.S. Application Data

(60) Provisional application No. 61/749,717, filed on Jan. 7, 2013.

(51) Int. Cl.
*G06F 15/00* (2006.01)
*H04N 1/32* (2006.01)
*H04N 1/00* (2006.01)

(52) U.S. Cl.
CPC ....... *H04N 1/32496* (2013.01); *H04N 1/00103* (2013.01); *H04N 1/00278* (2013.01)

(58) Field of Classification Search
USPC ........................................................ 358/1.15
See application file for complete search history.

(56) References Cited

U.S. PATENT DOCUMENTS

2007/0133040 A1* 6/2007 Tredoux et al. ............... 358/1.15
2009/0262385 A1* 10/2009 Dantwala ..................... 358/1.15

* cited by examiner

*Primary Examiner* — Saeid Ebrahimi Dehkord

(57) ABSTRACT

Some of the embodiments of the present disclosure provide a method of configuring a multi-function printer that includes printing, by the multi-function printer, a document, wherein the document is configured to receive information input from a user for configuring the multi-function printer. The method further includes scanning, by the multi-function printer, the document, wherein the document includes the information input by the user for configuring the multi-function printer. The method also includes responsive to the multi-function printer scanning the document, configuring the multi-function printer in accordance with the information input by the user for configuring the multi-function printer.

21 Claims, 3 Drawing Sheets

METHOD AND SYSTEM FOR CONFIGURING A PRINTER USING PAPER-BASED DIALOG BOXES

CROSS REFERENCE TO RELATED APPLICATIONS

This claims priority to U.S. Provisional Patent Application No. 61/749,717, filed on Jan. 7, 2013, which is incorporated herein by reference.

TECHNICAL FIELD

Embodiments of the present disclosure relate to configuring peripheral devices for use with computing devices and more particularly, to configuring a multi-function printing device for use with a wireless computing device.

BACKGROUND

Multi-function printers are configured to perform various types of operations. These operations generally include at least printing and scanning operations. Thus, multi-function printers are popular peripheral devices for computing systems.

Today, many homes, small businesses, and even large businesses, are setting up computing networks via wireless local access networks. Such wireless local access networks allow for computing devices and peripheral devices to communicate with one another via a wireless access point. However, more and more of such wireless local access networks do not necessarily include a host device in the form of a wired computer that operates with some type of operating system such as, for example, Windows, Macintosh, Linux, etc. Accordingly, in order to add a peripheral device to a wireless local access network, such as a multi-function printer, and configure the peripheral device, a user often must go through a wireless computing device within the wireless local access network such as, for example, a smart phone, a tablet computing device, a notebook, a laptop, etc. Without a wired connection between one of these wireless computing devices and the peripheral device, it can be difficult to add the peripheral device to the wireless local access network and configure the peripheral device since such addition and configuration needs to be accomplished by a user physically interacting with the peripheral device. Generally, multi-function printers can include minimal user interfaces and screens for use by the user in order to maintain lower costs for the multi-function printer. Thus, it can be difficult to add a multi-function printer to the wireless local access network without physically coupling the multi-function printer to a wired computing device.

SUMMARY

In various embodiments, the present disclosure provides a method of configuring a multi-function printer that includes printing, by the multi-function printer, a document, wherein the document is configured to receive information input from a user for configuring the multi-function printer. The method further includes scanning, by the multi-function printer, the document, wherein the document includes the information input by the user for configuring the multi-function printer. The method also includes responsive to the multi-function printer scanning the document, configuring the multi-function printer in accordance with the information input by the user for configuring the multi-function printer.

The present disclosure also provides a multi-function printer that includes a first portion, wherein the first portion is configured to print; a second portion, wherein the second portion is configured to scan; and a third portion, wherein the third portion is configured to control (i) the first portion and (ii) the second portion. The third portion is configured to execute logic to cause the first portion to print a document, wherein the document is configured to receive information input from a user for configuring the multi-function printer; the second portion to scan the document, wherein the document includes the information input by the user for configuring the multi-function printer; and responsive to the second portion scanning the document, configure the multi-function printer in accordance with the information input by the user for configuring the multi-function printer.

The present disclosure also provides an article of manufacture comprising a non-transitory storage medium having instructions stored thereon that, when executed by a processor, result in printing, by a multi-function printer, a document, wherein the document is configured to receive information input from a user for configuring the multi-function printer; scanning, by the multi-function printer, the document, wherein the document includes the information input by the user for configuring the multi-function printer; and responsive to the multi-function printer scanning the document, configuring the multi-function printer in accordance with the information input by the user for configuring the multi-function printer.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure.

DETAILED DESCRIPTION

Figure 1A:
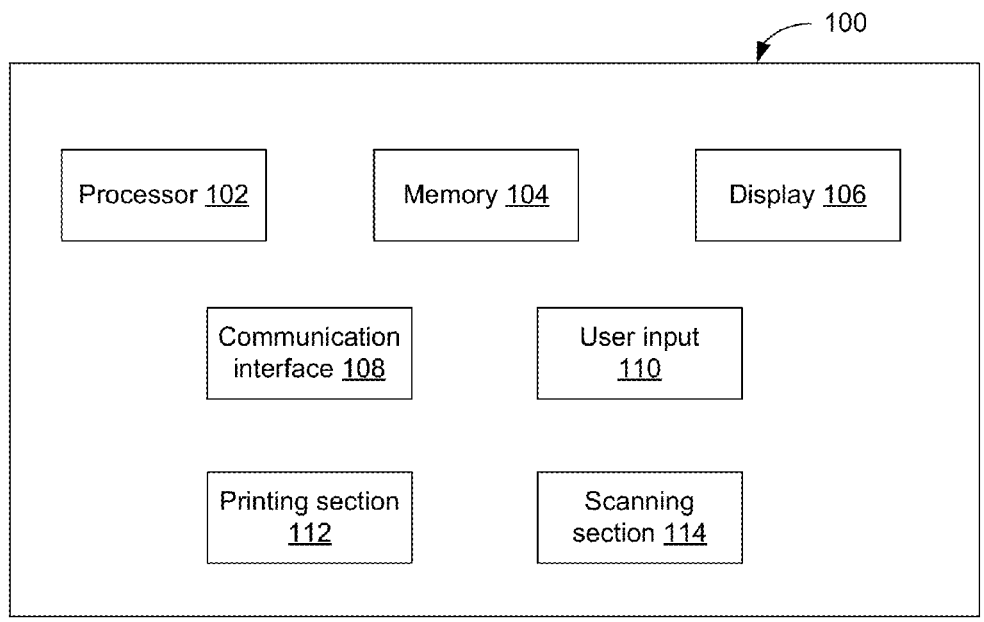
FIG. 1A schematically illustrates a multi-function printer.

FIG. 1A schematically illustrates a multi-function printer 100. In an embodiment, the multi-function printer 100 comprises a processor 102, memory 104 and optionally a display 106. The processor 102 can be in the form of one or more processors, multi-processing cores, etc., that, in some embodiments, can be configured as a system on chip (SOC). More particularly, the processor 102, in some embodiments, can be configured as a printer SOC, which thus generally defines a control section of the multi-function printer 100. The memory 104 can include various types of memory such as, for example, random access memory (RAM), flash memory, etc. Furthermore, the processor 102 is configured to execute instructions to operate the multi-function printer 100. The instructions are generally stored in the memory 104. The display 106, if included, is configured to display information associated with operation of the multi-function printer 100.

The multi-function printer 100 further includes one or more communication interfaces 108. At least one of the communication interfaces 108 is a wireless communication interface that allows the multi-function printer 100 to communicate wirelessly with other devices. The multi-function printer 100 may also include other communication interfaces to allow for other forms of communication between the multi-function printer 100 and other devices. The multi-function printer 100 also includes one or more user inputs 110 to allow a user to control operation of the multi-function printer 100.

The multi-function printer 100 further includes a printing section 112 and a scanning section 114. The printing section 112 is configured to allow the multi-function printer 100 to print documents. Likewise, the scanning section is configured to allow the multi-function printer 100 to scan documents.

Figure 1B:
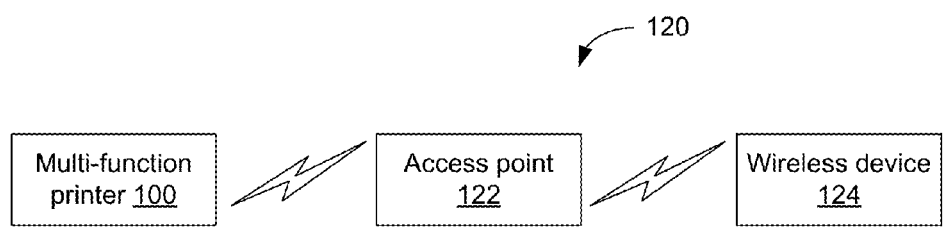
FIG. 1B schematically illustrates a wireless local access network that includes the multi-function printer of FIG. 1A.

FIG. 1B schematically illustrates a wireless local access network 120, where multi-function printer 100 is in communication with wireless access point 122. Wireless access point 122 is also in communication with a wireless computing device 124. Examples of wireless computing devices include, but are not limited to, laptop computers, notebook computers, tablet computers, personal digital assistants (PDAs), smart phones and other mobile phones. In order for the multi-function printer 100 to communicate with the wireless access point 122, and thereby the wireless computing device 124, the wireless access point 122 must recognize the multi-function printer 100, generally by associating the multi-function printer 100 with a basic service set identifier and/or a static internet protocol address for the wireless computing device 124. A service set generally is a set consisting of all the devices associated with a consumer or enterprise IEEE 802.11 wireless local area network (WLAN). The basic service set (BSS) provides the basic building-block of an IEEE 802.11 wireless local access network. In infrastructure mode, a single access point together with all associated stations (devices) is referred to as a "BSS." Associating the multi-function printer 100 with the wireless access point 122 can be difficult if the multi-function printer 100 is not coupled to a host device that operates with an operating system that can enumerate or configure the multi-function printer 100. Furthermore, the display 106, if even included, is generally so small it can be difficult to read so as not to be conducive for use in configuring the multi-function printer 100. Likewise, the user input 110 may not be conducive for use in configuring the multi-function printer 100.

In accordance with an embodiment, one of the one or more user inputs 110 may be a configuration input. When a user activates such a configuration input, the multi-function printer 100 enters a configuration mode. Alternatively, upon initial activation of the multi-function printer 100, the multi-function printer 100 may automatically enter the configuration mode. Furthermore, activation of a user input 110 may bring up a menu, which may be displayed on an included display 106 of the multi-function printer 100. The menu may provide the option for a user to cause the multi-function printer 100 to enter the configuration mode via further activation of a user input 110.

Figure 2:
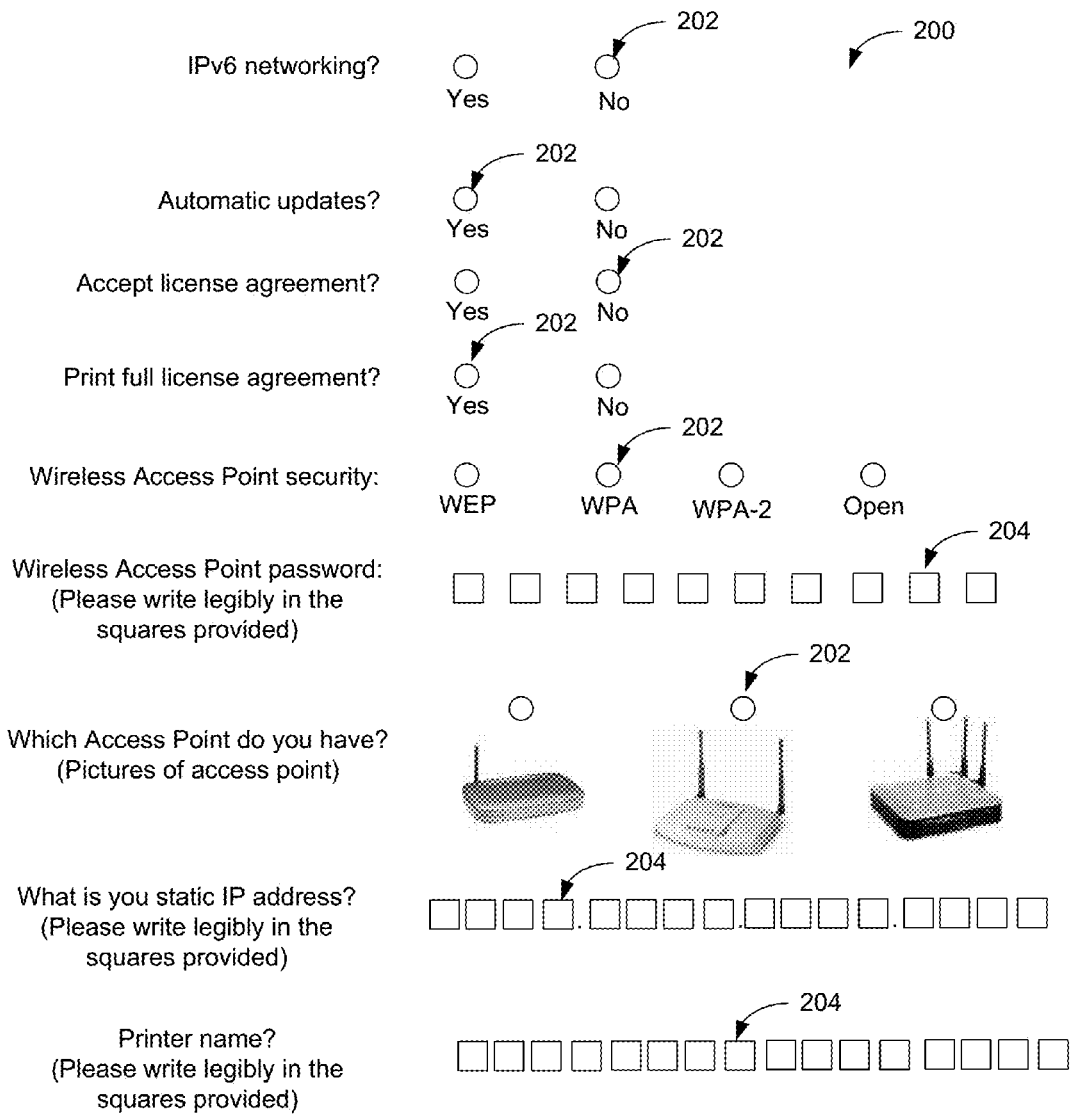
FIG. 2 schematically illustrates an example of a document printed by the multi-function printer of FIG. 1A, where the document is configured to receive information from a user for configuring the multi-function printer of FIG. 1A.

Referring to FIG. 2, upon entry of the printer into the configuration mode, the multi-function printer 100 prints a document 200. The document 200 can be printed on paper or any other suitable print medium. The document 200 dialog boxes that include various items configured to receive information from the user. For example, as may be seen in FIG. 2, bubbles 202 may be included that can be filled in by the user with a pencil or a pen. Likewise, boxes 204 may be included for the user to write in letters or numbers. Thus, document 200 includes paper based dialog boxes.

Upon completion of entering the appropriate information on the document 200, the user scans the document into the multi-function printer 100. The multi-function printer 100 includes recognition software that can recognize the filled-in bubbles 202 and read the written letters or numerals in the boxes 204. For example, such software is similar to that used to read various answer sheets for testing purposes, ballots during elections, etc. Software that can read written letters and numerals is similar to, for example, software utilized by the United States Postal Service and other delivery-type companies for reading written addresses and instructions for delivering mail, packages, etc.

The scanning of the user-completed document can be instigated by activating the configuration input of the one or more user inputs 110 so that the multi-function printer 100 knows to scan the document and process the information contained thereon. Alternatively, one of the one or more user inputs 110 may be activated and options may be selected from a menu on the display 106 so that the multi-function printer 100 knows to scan the document and process the information thereon in order to configure the multi-function printer 100.

FIG. 2 illustrates examples of various types of information that can be input into the multi-function printer 100 using the document 200 during the configuration mode. For example, information could be included as to the type of wireless network local access network 120, e.g., internet protocol version 6 networking (IPv6 networking). A user can fill in the appropriate "yes" or "no" bubble 202 to be read by the multi-function printer 100. Another example includes asking if the user would like automatic updates for the multi-function printer 100. The document 200 can also inquire if the user accepts the license agreement for the multi-function printer 100. Additionally, the document 200 can see if the user would like to have the multi-function printer 100 print the full license agreement. Another example of information that can be requested on the document 200 is the type of wireless access point security for the wireless local access network 120. The document 200 will generally also ask the user to write in the wireless access password for the wireless access point 122 in the boxes 204 provided. A request can also be provided for the user to write legibly.

Pictures can also be utilized to gather information from the user. For example, pictures of various types of access points can be listed and the user can fill in the appropriate bubble 202 that indicates which access point 122 the user has for the wireless local access network 120. The document 200 will generally also request a static internet protocol address from the user. Once again, the document 200 generated can include a request that the user write legibly. Additionally, although not illustrated, the form can also request the BSS identifier for the wireless local access network 120. The document 200 can also ask for a name for the multi-function printer 100 and have the user write the name for the multi-function printer 100 in the provided boxes 204. This is especially useful if multiple printers are included in the wireless local access network 120 so that the user can select the appropriate printer for printing jobs within the wireless local access network 120.

Figure 3:
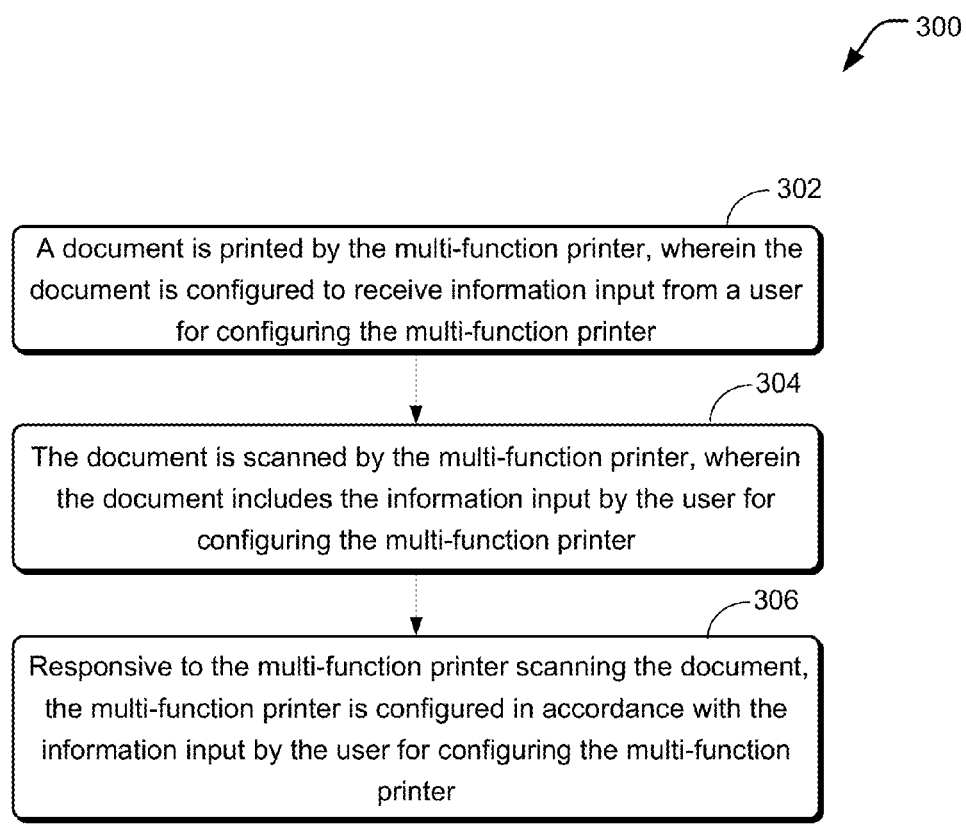
FIG. 3 is a flow diagram illustrating an example method of configuring the multi-function printer of FIG. 1A using the document of FIG. 2.

FIG. 3 is a flow diagram illustrating an example method 300 of configuring a multi-function printer, such as multi-function printer 100, using a document, such as document 200, paper based dialog boxes. At 302, a document is printed by the multi-function printer, wherein the document is configured to receive information input from a user for configuring the multi-function printer. At 304, the document is scanned by the multi-function printer, wherein the document includes the information input by the user for configuring the multi-function printer. At 306, responsive to the multi-function printer scanning the document, the multi-function printer is configured in accordance with the information input by the user for configuring the multi-function printer.

In accordance with various embodiments, an article of manufacture may be provided that includes a storage medium having instructions stored thereon that, if executed, result in the operations described herein with respect to certain aspects of the method 300 (and/or various other operations discussed herein). In an embodiment, the storage medium comprises some type of non-transitory memory, such as memory 104. In accordance with various embodiments, the article of manufacture may be a computer-readable medium such as, for example, software or firmware.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method of configuring a multi-function printer, the method comprising:
    printing, by the multi-function printer, a document, wherein the document is configured to receive information input from a user for configuring the multi-function printer;
    scanning, by the multi-function printer, the document, wherein the document includes the information input by the user for configuring the multi-function printer; and
    responsive to the multi-function printer scanning the document, configuring the multi-function printer in accordance with the information input by the user for configuring the multi-function printer.

2. The method of claim 1, wherein:
    the multi-function printer includes a user input, wherein the user input is configured to cause the multi-function printer to enter a configuration mode; and
    printing, by the multi-function printer, the document occurs in response to a first activation of the user input causing the multi-function printer to enter the configuration mode.

3. The method of claim 2, wherein scanning, by the multi-function printer, the document occurs in response to a second activation of the user input.

4. The method of claim 1, wherein the information includes one or more of (i) static internet protocol address, (ii) a wireless access point, (iii) a password, (iv) wireless access point security, (v) desire to receive automatic updates, (vi) printing of a license agreement, and (vii) acceptance of the license agreement.

5. The method of claim 1, wherein the document is configured with one or more of (i) circles to be filled in by the user and (ii) squares to be filled with written characters written by the user.

6. The method of claim 1, wherein configuring the multi-function printer comprises configuring the multi-function printer to access a wireless access point.

7. The method of claim 6, wherein the wireless access point is accessed by a wireless device of the user.

8. The method of claim 6, wherein configuring the multi-function printer to access a wireless access point comprises automatically selecting a wireless access point.

9. The multi-function printer of claim 1, wherein:
    the multi-function printer further comprises a user input, wherein the user input is configured to cause the multi-function printer to enter a configuration mode; and
    the third portion causes the first portion to print the document in response to a first activation of the user input causing the multi-function printer to enter the configuration mode.

10. The multi-function printer of claim 9, wherein the third portion causes the second portion to scan the document in response to a second activation of the user input.

11. The method of claim 1, wherein:
    the information input by the user comprises information for connecting the multi-function printer to a wireless access network; and
    configuring the multi-function printer comprises
        responsive to (i) the multi-function printer scanning the document and (ii) the scanned document comprising information input by the user for connecting the multi-function printer to the wireless access network, connecting the multi-function printer to the wireless access network.

12. The method of claim 1, wherein the information input by the user is written by the user on the document subsequent to the document being printed by the multi-function printer, and prior to the document being scanned by the multi-function printer.

13. The method of claim 1, wherein:
    the document, as printed by the multi-function printer, does not include any configuration parameter or attribute of the multi-function printer; and
    the document, as printed by the multi-function printer, comprises a plurality of fields that are to be completed by the user, wherein the plurality of fields, when completed by the user, represents a plurality of configuration parameters for configuring the multi-function printer.

14. A multi-function printer comprising:
    a first portion, wherein the first portion is configured to print;
    a second portion, wherein the second portion is configured to scan; and
    a third portion, wherein the third portion is configured to control (i) the first portion and (ii) the second portion, and wherein the third portion is configured to execute logic to cause
        the first portion to print a document, wherein the document is configured to receive information input from a user for configuring the multi-function printer, the second portion to scan the document, wherein the document includes the information input by the user for configuring the multi-function printer, and responsive to the second portion scanning the document, configure the multi-function printer in accordance with the information input by the user for configuring the multi-function printer.

15. The multi-function printer of claim 14, wherein the information includes one or more of (i) static internet protocol address, (ii) a wireless access point, (iii) a password, (iv) wireless access point security, (v) desire to receive automatic updates, (vi) printing of a license agreement, and (vii) acceptance of the license agreement.

16. The multi-function printer of claim 14, wherein the document is configured with one or more of (i) circles to be filled in by the user and (ii) squares to be filled with written characters written by the user.

17. The multi-function printer of claim 14, wherein the third portion configures the multi-function printer to access a wireless access point.

18. The multi-function printer of claim 17, wherein the wireless access point is accessed by a wireless device of the user.

19. The multi-function printer of claim 17, wherein the third portion configures the multi-function printer to access a wireless access point by automatically selecting a wireless access point.

20. An article of manufacture comprising a non-transitory storage medium having instructions stored thereon that, when executed by a processor, result in:

printing, by a multi-function printer, a document, wherein the document is configured to receive information input from a user for configuring the multi-function printer;

scanning, by the multi-function printer, the document, wherein the document includes the information input by the user for configuring the multi-function printer; and responsive to the multi-function printer scanning the document, configuring the multi-function printer in accordance with the information input by the user for configuring the multi-function printer.

21. The article of manufacture of claim 20, wherein the document is configured with one or more of (i) circles to be filled in by the user and (ii) squares to be filled with written characters written by the user.

\* \* \* \* \*